United States Patent
Zhan et al.

(10) Patent No.: US 12,190,403 B2
(45) Date of Patent: Jan. 7, 2025

(54) IMAGE WATERMARKING

(71) Applicant: GOOGLE LLC, Mountain View, CA (US)

(72) Inventors: Ruohan Zhan, Stanford, CA (US); Feng Yang, Sunnyvale, CA (US); Xiyang Luo, Mountain View, CA (US); Peyman Milanfar, Menlo Park, CA (US); Huiwen Chang, Cambridge, MA (US); Ce Liu, Cambridge, MA (US)

(73) Assignee: Google LLC, Mountain View, CA (US)

( * ) Notice: Subject to any disclaimer, the term of this patent is extended or adjusted under 35 U.S.C. 154(b) by 254 days.

(21) Appl. No.: 17/792,062

(22) PCT Filed: Jan. 13, 2020

(86) PCT No.: PCT/US2020/013272
§ 371 (c)(1),
(2) Date: Jul. 11, 2022

(87) PCT Pub. No.: WO2021/145849
PCT Pub. Date: Jul. 22, 2021

(65) Prior Publication Data
US 2023/0111326 A1    Apr. 13, 2023

(51) Int. Cl.
*G06T 1/00* (2006.01)
*G06T 9/00* (2006.01)
(Continued)

(52) U.S. Cl.
CPC ............. *G06T 1/0021* (2013.01); *G06T 9/00* (2013.01); *G06V 10/751* (2022.01); *G06V 10/82* (2022.01)

(58) Field of Classification Search
CPC . G06T 1/0021; G06T 9/00; G06T 2201/0202; G06T 1/005; G06V 10/751; G06V 10/82; G06N 3/045; G06N 3/08
See application file for complete search history.

(56) References Cited

U.S. PATENT DOCUMENTS

2004/0228502 A1    11/2004    Bradley et al.
2014/0184647 A1*    7/2014    Tessel .................. G06T 1/0021
                                                           345/634

FOREIGN PATENT DOCUMENTS

| CN | 1756340 | 4/2006 |
|----|---------|--------|
| CN | 102859586 | 1/2013 |
| CN | 109447906 | 3/2019 |

OTHER PUBLICATIONS

Ahmadi et al., "ReDMark: Framework for residual diffusion watermarking based on deep networks," Expert Systems with Applications, Dec. 25, 2019, 15 pages.

(Continued)

*Primary Examiner* — Christopher Wait
(74) *Attorney, Agent, or Firm* — Fish & Richardson P.C.

(57) ABSTRACT

Methods, systems, and computer programs encoded on a computer storage medium, that relate to extracting digital watermarks from images, irrespective of distortions introduced into these images. Methods can include inputting a first data item into a channel encoder that can generate a first encoded data item that is greater in length than the first data item and that (1) includes the input data item and (2) new data this is redundant of the input data item. Based on the first encoded data item and a first image, an encoder model can generate a first encoded image into which the first encoded data is embedded as a digital watermark. A decoder model can decode the first encoded data item to generate a second data, which can be decoded by the channel decoder to generate data that is predicted to be the first data.

20 Claims, 5 Drawing Sheets

(51) Int. Cl.
   *G06V 10/75* (2022.01)
   *G06V 10/82* (2022.01)

(56) References Cited

OTHER PUBLICATIONS

Choi et al., "NECST: Neural Joint Source-Channel Coding." Submitted on May 2019, arXiv:1811.07557v3, 15 pages.
Github.com [online], "Necst.py" Apr. 2019, retrieved on Apr. 6, 2023, retrieved from URL <https://github.com/ermongroup/necst/blob/master/necst.py>, 23 pages.
Github.com [online], "Vimco_tf" Nov. 2016, retrieved on April 6, 20223, retrieved from URL <https://github.com/altosaar/vimco_tf>, 2 pages.
International Preliminary Report on Patentability in International Appln. No. PCT/US2020/013272, mailed on Jul. 28, 2022, 9 pages.
International Search Report and Written Opinion in International Appln. No. PCT/US2020/013272, mailed on Oct. 23, 2020, 16 pages.
Mnih et al., "Variational inference for monte carlo objectives." Submitted on Jun. 2016, arXiv:1602.06725, 12 pages.
Tancik et al., "StegaStamp: Invisible Hyperlinks in Physical Photographs" Submitted on Mar. 2020, arXiv:1904.05343v2, 13 pages.
Wengrowski et al., "Light Field Messaging with Deep Photographic Steganography" CVPR 2019, 1515-1524.
Zhang et al., "Steganogan: Pushing the limits of image steganography." Submitted on Jan. 2019, arXiv:1901.03892v1, 13 pages.
Zhu et al., "HiDDen: Hiding Data with Deep Networks," Submitted on Jul. 2018, arXiv:1807.09937v1, 22 pages.
Office Action in Chinese Appln. No. 202080096987.5, mailed on Aug. 20, 2024, 20 Pages (with English translation).

\* cited by examiner

IMAGE WATERMARKING

CROSS-REFERENCE TO RELATED APPLICATIONS

This application is a National Stage Application under 35 U.S.C. § 371 and claims the benefit of International Application No. PCT/US2020/013272, filed Jan. 13, 2020. The disclosures of the foregoing applications are incorporated herein by reference in their entirety.

BACKGROUND

This specification generally relates to extracting digital watermarks embedded in images, irrespective of the distortions that may have been introduced into these images.

Image watermarking (which is also referred to in this specification as digital watermarking) is the process of embedding a digital watermark into an image—i.e., embedding information into an image such that the image with the digital watermark is visually indistinguishable from the original image, which does not include the digital watermark. Although image watermarking has several applications, it has traditionally been used to identify ownership of copyright in an image or otherwise identify the source of the image. As one example, a source of an image can embed a digital watermark into an image before distributing it. Subsequently, when a recipient receives the image, the recipient can extract the digital watermark from the image and if the extracted digital watermark is the same as the digital watermark embedded into the image by the source, the recipient can confirm that the received image originated from the source.

However, from the time when a source distributes the image until it is received by a target entity, one or more different types of distortions may be introduced into the image. Examples of such image distortions include, but are not limited to, cropping, rotation, blurring, and JPEG compression. As such, when a recipient receives the image, the image may include one or more of such distortions. In some instances, the distortions can corrupt the image such that all or a portion of the digital watermark can no longer be extracted. As a result, the recipient of the image may not be able to confirm the source of the image.

SUMMARY

In general, one innovative aspect of the subject matter described in this specification can be embodied in methods that include the operations of obtaining a first image and a first data item that is to be embedded into the first image; inputting the first data item into a channel encoder, wherein the channel encoder encodes an input data item of a first length into redundant data that (1) includes, either implicitly or explicitly, the input data item and (2) new data that is redundant of at least a portion of the input data item, and is of second length greater than the first length, wherein the new data enables recovery of the input data in the presence of channel distortion; obtaining, from the channel encoder and in response to inputting the first data item into the channel encoder, a first encoded data item; inputting the first encoded data item and the first image into an encoder model, wherein the encoder model encodes an input image and an input data item to obtain an encoded image into which the input data item has been embedded as a digital watermark; and obtaining, from the encoder model and in response to inputting the first encoded data item and the first image into the encoder model, a first encoded image into which the first encoded data has been embedded as a digital watermark. Other embodiments of this aspect include corresponding systems, devices, apparatus, and computer programs configured to perform the actions of the methods. The computer programs (e.g., instructions) can be encoded on computer storage devices.

These and other embodiments can each optionally include one or more of the following features.

In some implementations, methods can include the operations of inputting the first encoded image into a decoder model, wherein the decoder model decodes an input encoded image to obtain data that is predicted to be embedded as a digital watermark within the input encoded image; obtaining, from the decoder model and in response to inputting the first encoded image into the decoder model, a second data that is predicted to be the first encoded data; inputting the second data into a channel decoder, wherein the channel decoder decodes input data to recover original data that was previously encoded by the channel encoder to generate the input data; and obtaining, from the channel decoder and in response to inputting the second data into the channel decoder, third data that is predicted to be the first data.

In some implementations, methods can include the operations of obtaining a set of input training images; obtaining a first set of training images, wherein each image in the first set of training images is generated by encoding an input training image and an encoded data item using the encoder model, wherein the encoded data item is generated by encoding an original data item using the channel encoder; inputting the first set of training images into an attack network, wherein the attack network uses a set of input images to generate a corresponding set of images that includes different types of image distortions; and generating, using the attack network and in response to inputting the first set of input training images into the attack network, a second set of training images, wherein images in the second set of training images corresponds to images in the first set of training images.

In some implementations, methods can include the operations f training the attack network using the first set of training images and the second set of training images, wherein the training comprises: for each training image in the first set of training images and a corresponding training image in the second set of training images: inputting the training image from the second set of training images into the decoder model; obtaining, from the decoder model and in response to inputting the training image from the second set of training images into the decoder model, a first predicted data item that is predicted to be embedded as a digital watermark within the training image; determining a first image loss representing a difference in image pixel values between the training image in the first set of training images and the corresponding training image in the second set of training images; determining a first message loss representing a difference between the first predicted data item and the encoded data item embedded into the training image in the first set of training images; and training the attack network using the first image loss and the first message loss.

In some implementations, methods can include the operations of training the encoder model and the decoder model, wherein the training comprises: for each training image in the first set of training images: inputting the training image into the decoder model; obtaining, from the decoder model and in response to inputting the training image into the decoder model, a second predicted data item that is predicted to be embedded within the training image; determining a second image loss representing a difference in image pixel values between the training image and the corresponding input training image; determining a second message loss representing a difference between the second predicted data item and the encoded data embedded into the training image; and training each of the encoder model and decoder model using the second image loss, the second message loss, and the first message loss.

In some implementations, each of the attack model, the encoder model, and the decoder model can be a convolutional neural network.

In some implementations, the second image loss can comprise an L2 loss and a GAN loss; and the second message loss can comprise an L2 loss.

In some implementations, each of the first message loss and the first image loss can comprise an L2 loss.

In some implementations, methods can include the operations of training the channel encoder and the channel decoder, wherein the training comprises: obtaining a set of training data items; for each training data item in the set of training data items: generating, using the channel encoder, an encoded training data item; generating, for the encoded training data item and using a channel distortion approximation model, a modified training data item, wherein the encoded training data item is distorted using the channel distortion approximation model to generate the modified training data item; determining a channel loss representing a difference between the encoded training data item and the corresponding modified training data item; and training each of the channel encoder and the channel decoder using the channel loss.

Particular embodiments of the subject matter described in this specification can be implemented to realize one or more of the following advantages. The innovations described in this specification enable extracting watermark messages embedded within encoded images irrespective of the type of the distortion that may be introduced between the time that the digital watermark is embedded into an image and the time that the digital watermark is extracted from the encoded image. Conventional watermarking systems are trained on particular types of image distortions. While such conventional systems can extract, with a high level of accuracy, digital watermarks from images that have been subject to distortions for which such systems are trained, these systems are generally unable to extract, with the same level of accuracy, digital watermarks from images that are subject to different types of distortions (i.e., distortions on which such systems are not trained). In contrast, the techniques described in this specification can (1) extract digital watermarks from images that are subject to the known types of distortions (i.e., distortions on which conventional systems are trained) with the same level of accuracy as conventional watermarking systems and (2) extract digital watermarks from images that are subject to unknown distortions (i.e., distortions on which conventional systems are not trained) with a higher level of accuracy in comparison to the conventional watermarking systems. The techniques described in this specification can thus allow for more reliable encoding of watermarks (or other hidden data) in images that are transmitted over noisy/distorting channels.

Relatedly, the innovations described in this specification do not require any prior knowledge or exposure to a particular distortion to enable high accuracy extraction of digital watermarks from images with that same distortion. Conventional watermarking systems generally need to be exposed during training to the particular type of distortion to enable extraction, with a high level of accuracy, digital watermarks embedded within images subject to such distortion. In contrast, the innovations described in this specification do not require any prior knowledge of or exposure to a particular distortion, during training or otherwise, to enable high accuracy extraction of watermark messages embedded within images subject to such distortion. For example, and as described throughout this document, the innovations described in this specification utilize adversarial training to enable distortion agnostic digital watermark extraction from images. As part of this adversarial training, the adversarial model generates training images that implicitly incorporate a wide collection of image distortions that co-adapt with training.

Moreover, the innovations described in this specification are more robust than conventional systems. This is because, rather than simply embedding the digital watermark into the image, the innovations described in this specification add redundancy to the digital watermark before embedding it into the image, which in turn increases the likelihood of recovering the original digital watermark in the presence of certain reasonable amount of channel distortions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally relates to extracting digital watermarks embedded in images, irrespective of the distortions that may have been introduced into these images.

Figure 1:
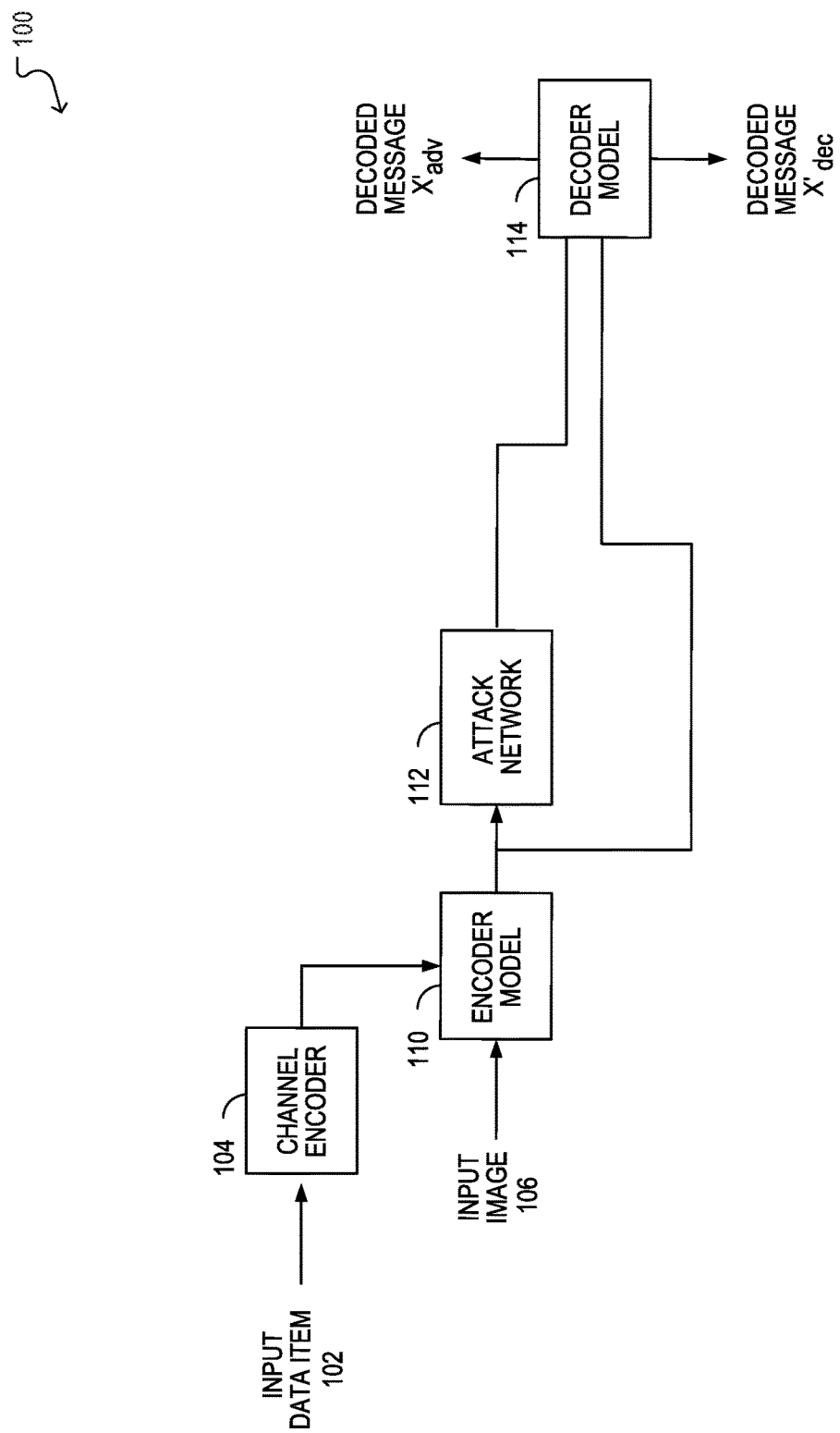
FIG. 1 is a block diagram of an example environment in which a system is trained to embed digital watermarks into images and subsequently extract the digital watermarks from the images.

FIG. 1 is a block diagram of an example environment 100 in which a system is trained to embed digital watermarks into images and subsequently extract the digital watermarks from the images. The structure and operations of the components of environment 100 are described with reference to FIG. 2.

Figure 2:
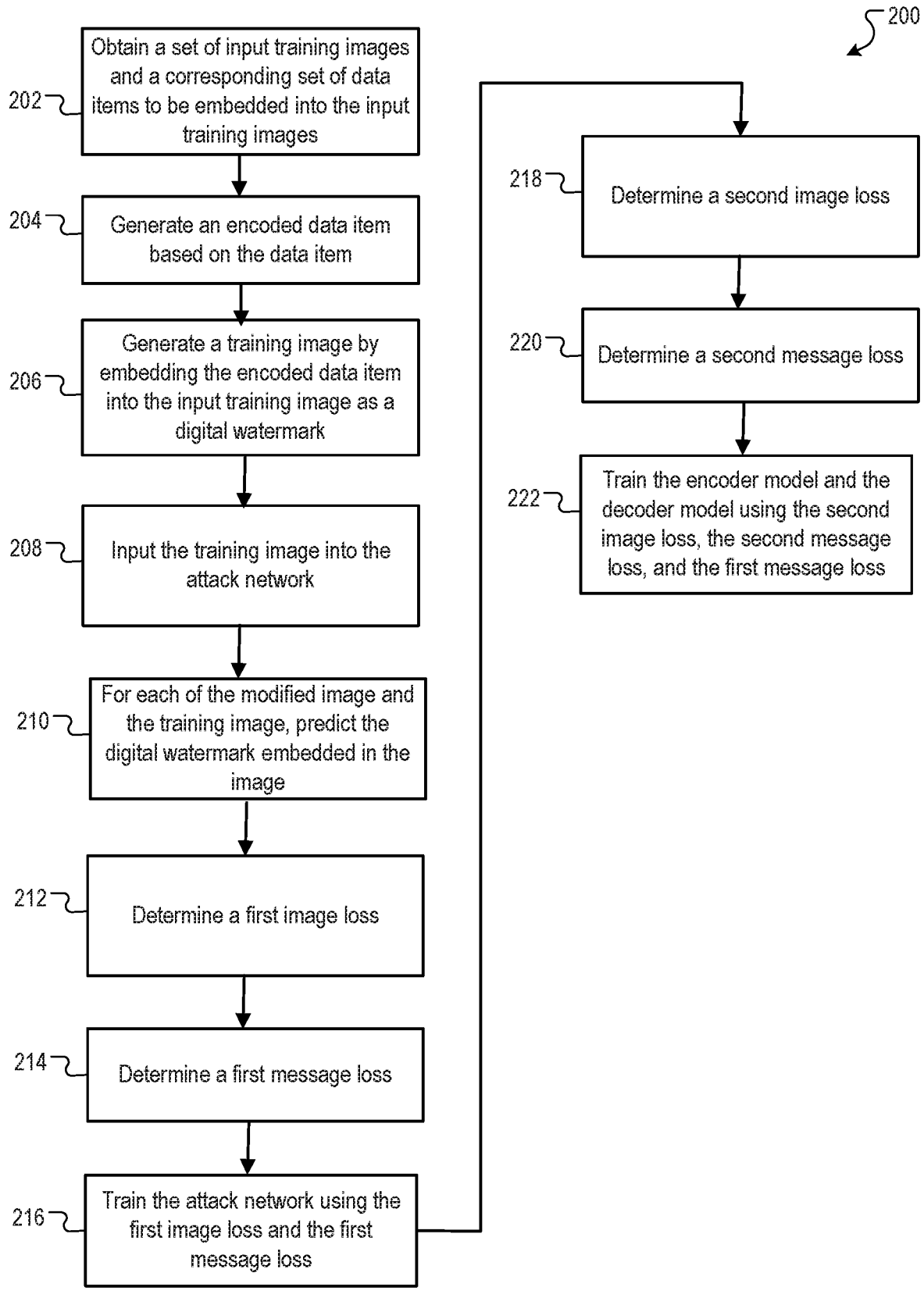
FIG. 2 is a flow diagram of an example process for training a watermarking system to embed digital watermarks into images and subsequently extract the digital watermarks from the images.

FIG. 2 is a flow diagram of an example process 200 for training a watermarking system to embed digital watermarks into images and subsequently extract the digital watermarks from the images. Operations of the process 200 are described below for illustration purposes only. Operations of the process 200 can be performed by any appropriate device or system, e.g., the system shown in FIG. 1 or any other appropriate data processing apparatus. Operations of the process 200 can also be implemented as instructions stored on a non-transitory computer readable medium. Execution of the instructions causes one or more data processing apparatus to perform operations of the process 200.

The process 200 obtains a set of input training images and a corresponding set of data items to be embedded into the input training images (at 202). In some implementations, the data items are messages or other information that are to be embedded in the image as a digital watermark. The data item, which can be of any length, can be a string of binary numbers (e.g., 0100101) or a string made up of numbers (i.e., binary and non-binary) and/or characters. For example, the data item can simply be a text message, such as "WATERMARK" or "COPYRIGHT OF XYZ CORP." As another example, the data can be a digital signature or other fingerprint of an entity that is the intended source of an image and/or that may be used to verify the source of the image. The set of input training images can be obtained from any storage location that includes images, such as the local storage that is located on a user device or a storage location accessible over a network (e.g., an image archive, a social media platform, or another content platform).

Operations 204-220, which are described below, describe the operations that are used in the adversarial training of the encoder and decoder models (which are further described below). As part of the adversarial training, two sets of training images are used to train the encoder and the decoder models. The first set of training images is generated by the encoder model, and the second set of training images is generated by an attack model (as further described below), which uses the first set of training images to generate a corresponding second set of images that are distorted using different types of image distortions. The attack network is trained to generate training images that include a vast and varied number of image distortions—i.e., much more than the particular types of distortions that are used in the training of conventional systems. The decoder model decodes both sets of training images to obtain the data items embedded as a digital watermark within each image. The encoder model and the decoder model are then trained based on the resulting "image loss" and "message loss" (as further described below) for each image in the first set of training images and the corresponding image in the second set of training images. Thus, to perform this adversarial training, operations 204-220 are performed iteratively for each training image in the set of input training images and for each corresponding data item from the set of data items that is to be embedded into the input training image.

The process 200 generates an encoded data item based on the data item (at 204). The process 200 inputs the data item 102 into a channel encoder 104, which outputs an encoded data item. In some implementations, the channel encoder 104 is a machine learning model (e.g., a neural network model) that is trained to encode each input data item into a redundant data item (which is also referred to as an encoded data item) that (1) includes, either implicitly or explicitly, the input data and (2) new data that is redundant of the input data item (e.g., redundant of the entire input data or at least a portion of the input data). The channel encoder is trained to generate the redundant data item/encoded data item to enable recovery of the input data item in the presence of channel distortion. As used in this specification, channel distortion refers to the errors in the system arising from the point where the encoded data item is generated to the point where decoder model outputs the data item predicted to be embedded within the image. The training of the channel encoder to generate the redundant data/encoded data item is described below. New data of the redundant data item can be added to the encoded data item in different ways. For example, for a data item {001100}, the encoded data item includes the data item and redundant data that replicates (one or more times) the input data item. In this example, the encoded data item can be replicated twice, thus resulting in {001100001100}, which is twice the length of the input data item. Another example technique in which the channel encoder adds redundancy in the form of the new data of the redundant data item includes, but is not limited to, the hamming code (also referred to block code).

The process 200 generates a training image by embedding the encoded data item (which was generated at operation 204) into the input training image as a digital watermark (at 206). In some implementations, the encoder model 110 accepts the encoded data item and the input training image as inputs and outputs an encoded image into which the encoded data item is embedded as a digital watermark. The encoder model 110 is a convolutional neural network (CNN).

The process 200 inputs the training image into an attack network, which outputs a modified image that includes a particular type of image distortion (at 208). In some implementations, the attack network 112 can be a two-layer convolutional neural network (CNN) that generates the modified images with a diverse set of image distortions based on the input training images. In other implementations, the attack network can be a Fast Gradient Sign Method (FGSM).

For each of the modified image (generated at operation 208) and the training image (generated at operation 206), the process 200 predicts the digital watermark embedded in the image (at 210). In some implementations, the modified image is input into a decoder model 114, which outputs a first predicted data item that is predicted to be the digital watermark embedded within the modified image. Similarly, the training image is input into the decoder model 114, which outputs a second predicted data item that is predicted to be the digital watermark embedded within the training image. As with the encoder model 110, the decoder model 114 is a CNN.

The process 200 determines a first image loss representing a difference in the image pixel values between the training image and the modified image (at 212). In some implementations, the first image loss includes an L2 loss between the image pixel values of the training image and that of the modified image. Thus, the first image loss can be represented using the following equation:

$$\alpha_1^{adv} \|I_{adv} - I_{enc}\|^2$$

As used in the above equation, "$I_{adv}$" refers to the image pixel values of the modified image, "$I_{enc}$" refers to the image pixel values of the encoded image/training image, and "$\alpha_1$" refers to a scalar weight. Other losses comparing the image pixel values of the training image and that of the modified image may alternatively be used, such an L1 loss or a p-norm. As another alternative, instead of image pixel values, other image metrics may be used such as the resolution, error rate, fidelity, and signal-to-noise ratio.

The process 200 determines a first message loss representing a difference between the first predicted data item and the encoded data item embedded into the training image (at 214). In some implementations, the first message loss includes an L2 loss between the first predicted data item and the encoded data item. Thus, the first message loss can be represented using the following equation:

$$\alpha_2^{adv}\|X_{adv}'-X'\|^2$$

As used in the above equation, "$X'_{adv}$" refers to the first predicted data item, "X'" refers to the encoded data item, and "$\alpha_2$" refers to a scalar weight. Other losses comparing the first predicted data item and the encoded data item may alternatively or additionally be used, such an L1 loss or a p-norm.

The process 200 trains the attack network 112 using the first image loss and the first message loss (at 216). In some implementations, the attack network 112 is trained to minimize a training loss, which is represented by a difference in the first image loss and the first message loss. As one example, the attack network 112 can be trained to minimize the following training loss:

$$L_{adv}=\alpha_1^{adv}\|I_{adv}'-I_{enc}\|^2-\alpha_2^{adv}\|X_{adv}'-X'\|^2$$

As used in the above equation, "$L_{adv}$" refers to the attack network's training loss. All other parameters referenced in the above equation are described with reference to operations 212 and 214. The scalar weight "α1" controls the strength of the distortion generated by the attack network 112, while the first message loss encourages the attack network 112 to generate modified training images that decrease the bit accuracy. Moreover, the complexity of the attack network 112 (e.g., based on the number of layers of CNN used) and the scalar weight "$\alpha_2$" provides a measure of the strength of the attack network. However, in some implementations, other training losses comparing the first image loss and the first message loss may alternatively or additionally be used.

The process 200 determines a second image loss representing a difference in image pixel values between the training image and the corresponding input training image (at 218). In some implementations, the second image loss includes an L2 loss and a Wasserstein generative adversarial network (WGAN) loss from a critic network that is trained to distinguish the image pixel values of the training image from the corresponding input training image. The second image loss can thus be represented using the following equation:

$$L_I=\alpha_1^I\|I_{co}-I_{en}\|^2+\alpha_2^I\text{WGAN}(I_{en})$$

As used in the above equation, "$L_I$" refers to the second image loss, "$\alpha_1^I$" and "$\alpha_2^I$" are scalar weights, "$I_{co}$" refers to the image pixel values of the input training image, and "$I_{en}$" refers to the image pixel values of the training image that is an encoded version of the input training image into which the encoded data item has been embedded. However, in some implementations, other loss functions for comparing a difference in image pixel values between the training image and the corresponding input training image may alternatively or additionally be used. For example, the WGAN loss function may be replaced with a minimax loss function. As another alternative, instead of image pixel values, other image metrics may be used such as the resolution, error rate, fidelity, and signal-to-noise ratio.

The process 200 determines a second message loss representing a difference between the second predicted data item and the encoded data item embedded into the training image (at 220). In some implementations, the second message loss is an L2 loss between the second predicted data item and the encoded data item that was embedded into the training image. The second message loss can thus be represented using the following equation:

$$L_M=\alpha_1^M\|X_{dec}'-X'\|^2$$

As used in the above equation, "$L_M$" refers to the second message loss, "$X'_{dec}$" refers to the second predicted data item, and "X'" refers to the encoded data item, and "$\alpha_1^M$" refers to a scalar weight. Other losses comparing the second predicted data item and the encoded data item may alternatively or additionally be used, such an L1 loss or a p-norm.

The process 200 trains each of the encoder model and the decoder model using the image loss, the message loss, and the first message loss (at 222). In some implementations, each of the encoder model 110 and the decoder model 114 are trained to minimize an overall model loss, which is a combination (e.g., sum) of the second image loss, the second message loss, and the first message loss.

In some implementations, the system shown in FIG. 1 does not include the channel encoder 104. In such implementations, the data item is directly embedded into the input training image by the encoder model 104 (as opposed to generating an encoded data item and then embedded this encoded data item into the input training image).

Figure 3:
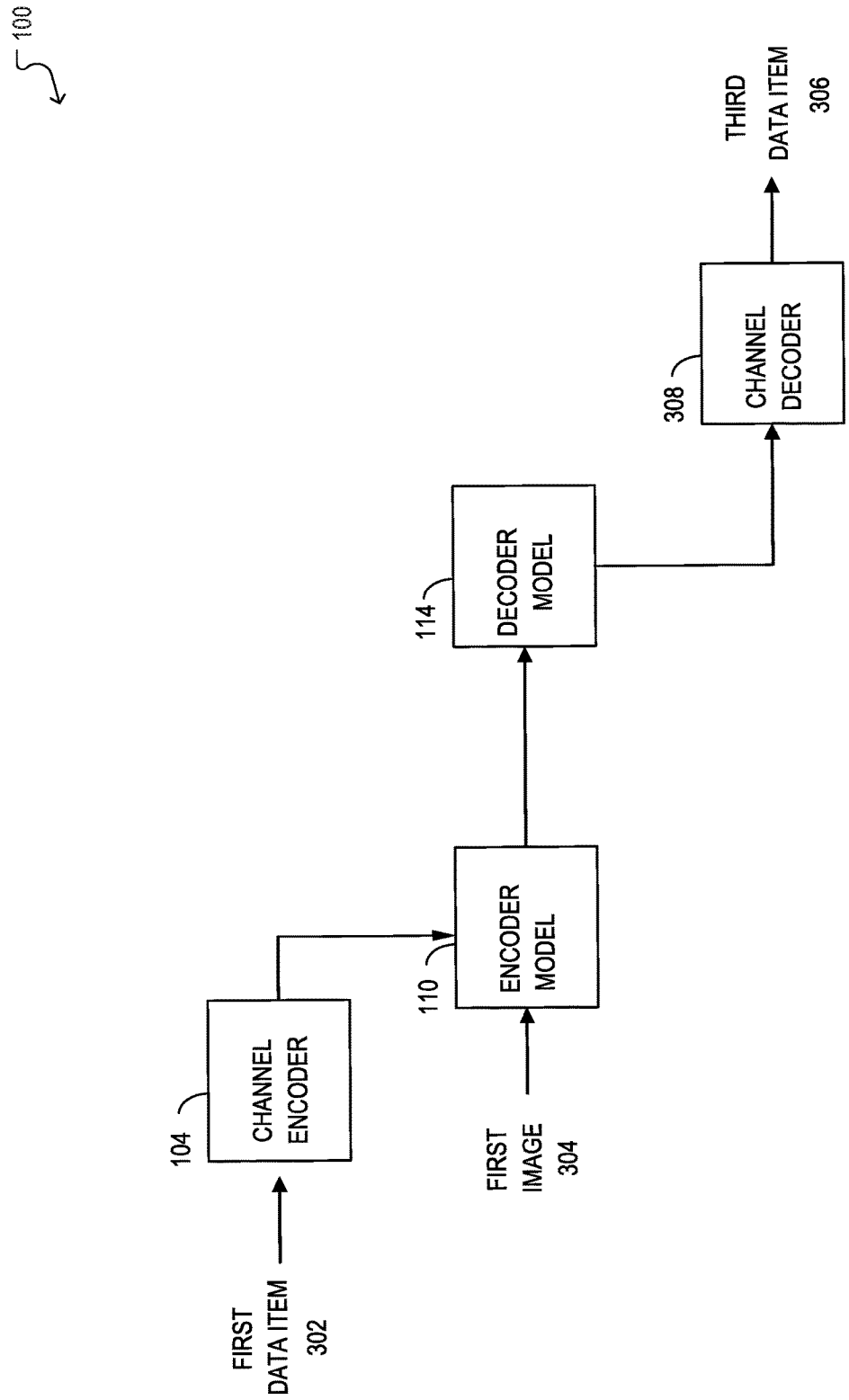
FIG. 3 is a block diagram of an example environment in which the trained system of FIG. 1 is used to embed digital watermarks into images and to subsequently extract digital watermarks from images.

FIG. 3 is a block diagram of an example environment 300 in which the trained system of FIG. 1 is used to embed digital watermarks into images and to subsequently extract digital watermarks from images.

The system of the environment 300 includes all the components of the system of environment 100, with the exception of the attack network 112, which is only used during training. Thus, the system of environment 300 include the channel encoder 104, the encoder model 110, the decoder model 114, and the channel decoder 118. The structure and operations of the these components of the environment 300 have already been described with reference to FIGS. 1 and 2 in the context of training. The same operations occur when these components are used to embed digital watermarks into images and to subsequently extract digital watermarks from images. These operations are summarily described with reference to FIG. 4.

In some implementation, the channel coding model (i.e., the channel encoder 104 and the channel decoder 308) is trained as follows. First, a set of training data items are obtained. In some implementations, the training data items are the same set of data items as referred to at operation 202. The training data items are input into the channel encoder 104, which in turn generates a corresponding set of encoded training data items (as described above with reference to FIG. 2). For each encoded training data item in the set of encoded training data items, a set of modified training data items (also referred to as noisy samples) is generated using a binary symmetric channel (BSC) model, which is used to approximate channel distortion (which refers to the errors in the system arising from the point where the encoded data item is generated to the point where decoder model outputs the data item predicted to be embedded within the image). BSC is a standard channel model, which assumes that each bit is independently and randomly flipped with a certain probability p. Alternatively, instead of the BSC, other channel models can be used, such as a binary erasure channel (BEC) model.

Each of the channel encoder 104 and the channel decoder 118 is trained to minimize a channel loss, which represents a loss between the encoded training data item and each modified training data item. In some implementations, the channel loss can be a VIMCO loss, which represents a multi-sample variational lower bound objective for obtaining low-variance gradients. The channel coding model can be trained for a certain number of iterations or until the loss of the channel coding model meets (e.g., is at or below) a certain loss threshold.

Figure 4:
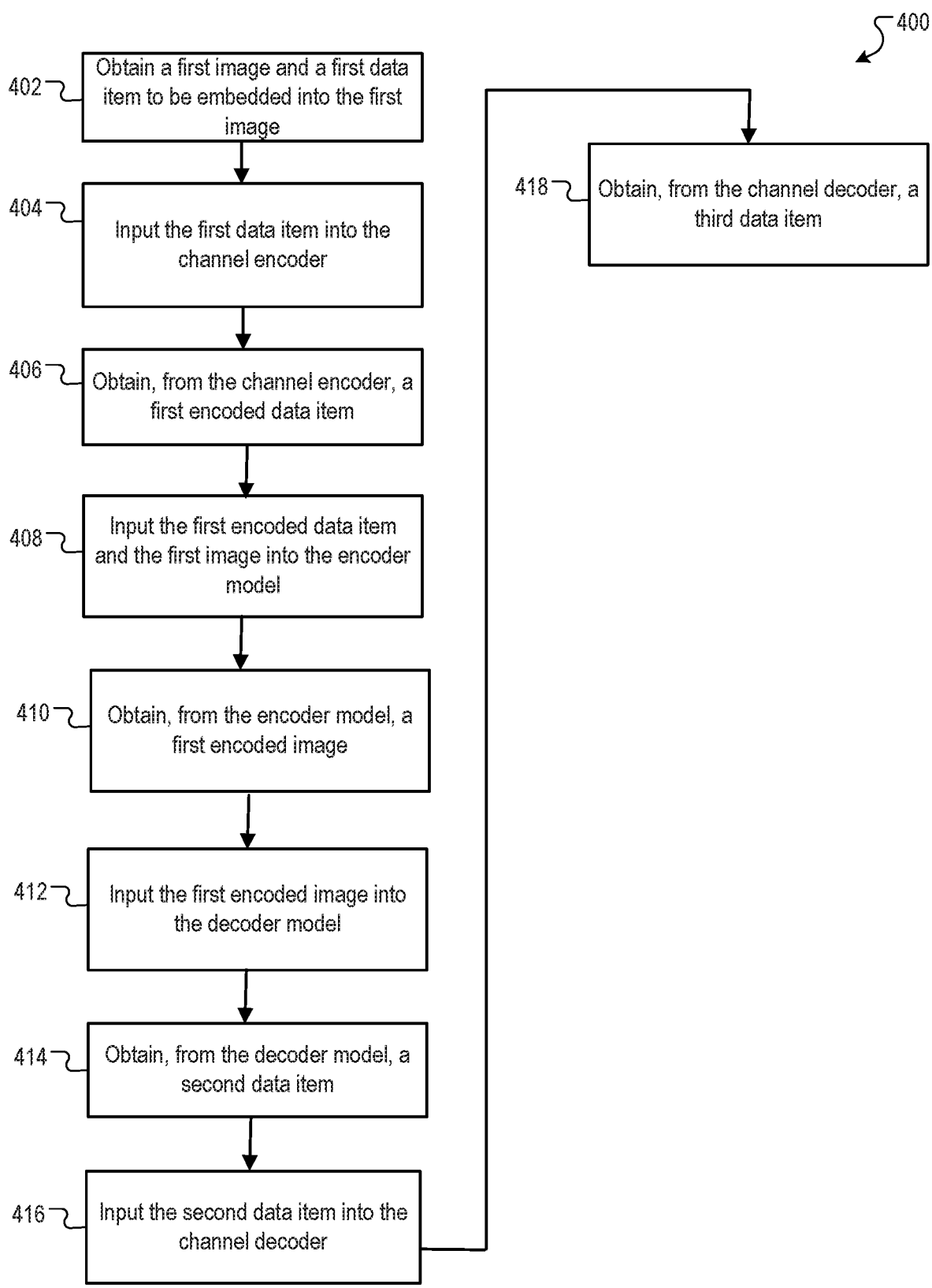
FIG. 4 is a flow diagram of an example process for embedding digital watermarks into images and subsequently extracting digital watermarks from images.

FIG. 4 is a flow diagram of an example process 400 for embedding digital watermarks into images and subsequently extracting digital watermarks from images. Operations of the process 400 are described below for illustration purposes only. Operations of the process 400 can be performed by any appropriate device or system, e.g., the system shown in FIG. 3 or any other appropriate data processing apparatus. Operations of the process 400 can also be implemented as instructions stored on a non-transitory computer readable medium. Execution of the instructions cause one or more data processing apparatus to perform operations of the process 400.

The process 400 obtains a first image 304 and a first data item 302 that is to be embedded into the first image 304 (at 402). The first image 304 and the first data 302 item can be obtained from the same or similar image source as described with reference to FIG. 2. Moreover, the first data item 302 is of the same type as the data items described with reference to FIG. 2.

The process 400 inputs the first data item 302 into the channel encoder 104 (at 404).

The process 400 obtains, from the channel encoder 104 and in response to inputting the first data item 302 into the channel encoder, a first encoded data item (at 406). As described with reference to FIG. 2, the channel encoder 104 encodes an input data item of a first length into redundant data that (1) includes, either implicitly (e.g., only some of the input data item or a representation of the input data item) or explicitly (e.g., a copy of the entirety of the input data item), the input data item and (2) new data that is redundant of at least a portion of the input data item, and is of second length greater than the first length. Accordingly, the first encoded data item includes redundant data that (1) includes, either implicitly or explicitly, the first data item 302 and (2) new data this is redundant of at least a portion of the first data item 302, and is of second length greater than the first length. Moreover, the redundancy in the first encoded data item enables recovery of the first data item in the presence of channel distortion.

The process 400 inputs the first encoded data item and the first image 304 into an encoder model 110 (at 408).

The process 400 obtains, from the encoder model 110, a first encoded image (at 410). As described with reference to FIG. 2, the encoder model 110 encodes an input image and an input data item to obtain an encoded image into which the input data item has been embedded as a digital watermark. Accordingly, the first encoded image output by the encoder model 110 embeds the first encoded data item into the first image 304 as a digital watermark.

The process 400 inputs the first encoded image into the decoder model 114 (at 412).

The process 400 obtains, from the decoder model 114 and in response to the input of the first encoded image into the decoder model 14, a second data item (at 414). As described with reference to FIG. 2, the decoder model decodes an input encoded image to obtain data that is predicted to be embedded as a digital watermark within the input encoded image. Accordingly, the second data item output by the decoder model 114 is predicted to be the first encoded data item was embedded as a digital watermark within the first encoded image.

The process 400 inputs the second data item into the channel decoder 118 (at 416).

The process 400 obtains, from the channel decoder 118 and in response to the input of the second data item into the channel decoder 118, a third data item 306 (at 418). As described with reference to FIG. 2, the channel decoder 118 decodes input data to recover original data that was previously encoded by the channel encoder to generate the input data. Accordingly, the third data item generated by the channel decoder 118 is predicted to be first data item that was previously encoded by the channel encoder into the first encoded data item.

Moreover, as described with reference to FIGS. 1 and 2, the system of environment 300 can, but need not, include the channel coding model. Accordingly, in some implementations, the system of environment 300 can include just the encoder model 110 and the decoder model 114 (i.e., the environment may not include the channel encoder 104 and the channel decoder 308).

In some implementations, the system shown in example environment 300 (and the corresponding operations described in FIG. 4) is implemented by the same entity. Alternatively, the channel encoder 104 and the encoder model 110 can be implemented by one entity and the decoder model 114 and the channel decoder 308 can be implemented by a separate entity. In such implementations, the entity that performs the data and/or image encoding is different from the entity that performs the data and/or image decoding.

Thus, as described with reference to FIGS. 3 and 4 (and the corresponding descriptions of FIGS. 1 and 2), this specification describes techniques for extracting digital watermarks from images, irrespective of the type of image distortion that might have been introduced into the image.

Figure 5:
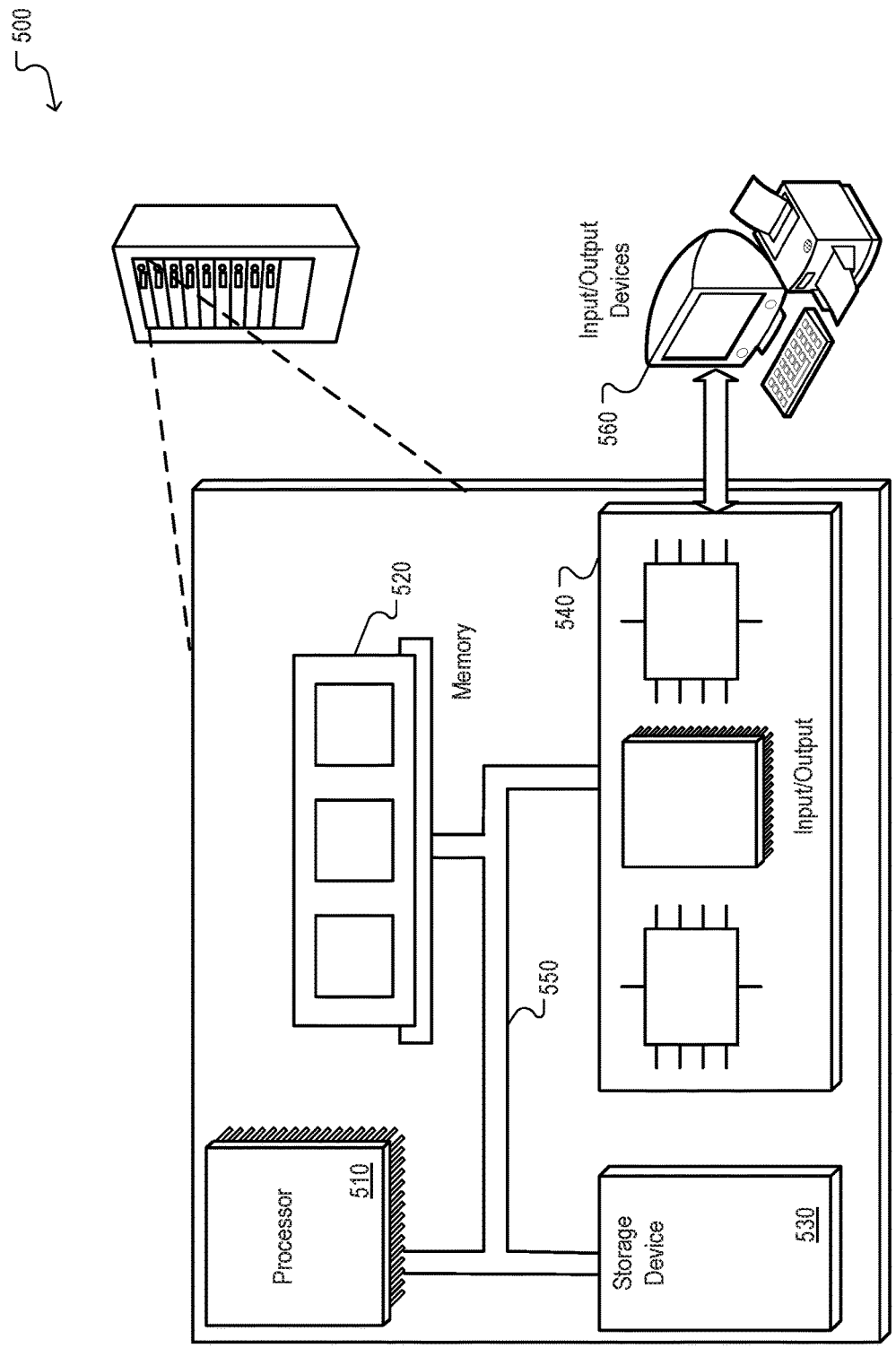
FIG. 5 is a block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
   obtaining a first image and a first data item that is to be embedded into the first image;
   inputting the first data item into a channel encoder, wherein the channel encoder encodes an input data item of a first length into redundant data that (1) includes the input data item and (2) new data this is redundant of the input data item, and is of second length greater than the first length, wherein the new data enables recovery of the input data in the presence of channel distortion;
   obtaining, from the channel encoder and in response to inputting the first data item into the channel encoder, a first encoded data item;
   inputting the first encoded data item and the first image into an encoder model, wherein the encoder model encodes an input image and an input data item to obtain an encoded image into which the input data item has been embedded as a digital watermark; and
   obtaining, from the encoder model and in response to inputting the first encoded data item and the first image into the encoder model, a first encoded image into which the first encoded data has been embedded as a digital watermark.

2. The computer implemented method of claim 1, further comprising:
   inputting the first encoded image into a decoder model, wherein the decoder model decodes an input encoded image to obtain data that is predicted to be embedded as a digital watermark within the input encoded image;
   obtaining, from the decoder model and in response to inputting the first encoded image into the decoder model, a second data that is predicted to be the first encoded data;
   inputting the second data into a channel decoder, wherein the channel decoder decodes input data to recover original data that was previously encoded by the channel encoder to generate the input data; and
   obtaining, from the channel decoder and in response to inputting the second data into the channel decoder, third data that is predicted to be the first data.

3. The computer implemented method of claim 1, further comprising:
   obtaining a set of input training images;
   obtaining a first set of training images, wherein each image in the first set of training images is generated by encoding an input training image and an encoded data item using the encoder model, wherein the encoded data item is generated by encoding an original data item using the channel encoder;
   inputting the first set of training images into an attack network, wherein the attack network uses a set of input images to generate a corresponding set of images that includes different types of image distortions; and
   generating, using the attack network and in response to inputting the first set of input training images into the attack network, a second set of training images, wherein images in the second set of training images corresponds to images in the first set of training images.

4. The computer implemented method of claim 1, further comprising training the attack network using the first set of training images and the second set of training images, wherein the training comprises:
   for each training image in the first set of training images and a corresponding training image in the second set of training images:
      inputting the training image from the second set of training images into the decoder model;
      obtaining, from the decoder model and in response to inputting the the training image from the second set of training images into the decoder model, a first predicted data item that is predicted to be embedded as a digital watermark within the training image;

determining a first image loss representing a difference in image pixel valus between the training image in the first set of training images and the corresponding training image in the second set of training images;

determining a first message loss representing a difference between the first predicted data item and the encoded data item embedded into the training image in the first set of training images; and training the attack network using the first image loss and the first message loss.

5. The computer implemented method of claim 4, further comprising training the encoder model and the decoder model, wherein the training comprises:

for each training image in the first set of training images:
inputting the training image into the decoder model;
obtaining, from the decoder model and in response to inputting the training image into the decoder model, a second predicted data item that is predicted to be embedded within the training image;

determining a second image loss representing a difference in image pixel values between the training image and the corresponding input training image;

determining a second message loss representing a difference between the second predicted data item and the encoded data embedded into the training image; and training each of the encoder model and decoder model using the second image loss, the second message loss, and the first message loss.

6. The method of claim 4, wherein each of the attack model, the encoder model, and the decoder model is a convolutional neural network.

7. The method of claim 5, wherein:
the second image loss comprises an L2 loss and a GAN loss; and
the second message loss comprises an L2 loss.

8. The method of claim 5, wherein each of the first message loss and the first image loss comprises an L2 loss.

9. The method of claim 2, further comprising training the channel encoder and the channel decoder, wherein the training comprises:

obtaining a set of training data items;
for each training data item in the set of training data items:
generating, using the channel encoder, an encoded training data item;
generating, for the encoded training data item and using a channel distortion approximation model, a modified training data item, wherein the encoded training data item is distorted using the channel distortion approximation model to generate the modified training data item;
determining a channel loss representing a difference between the encoded training data item and the corresponding modified training data item; and
training each of the channel encoder and the channel decoder using the channel loss.

10. A system, comprising:
one or more memory devices storing instructions; and
one or more data processing apparatus that are configured to interact with the one or more memory devices, and upon execution of the instructions, perform operations including:
obtaining a first image and a first data item that is to be embedded into the first image;

inputting the first data item into a channel encoder, wherein the channel encoder encodes an input data item of a first length into redundant data that (1) includes the input data item and (2) new data this is redundant of the input data item, and is of second length greater than the first length, wherein the new data enables recovery of the input data in the presence of channel distortion;

obtaining, from the channel encoder and in response to inputting the first data item into the channel encoder, a first encoded data item;

inputting the first encoded data item and the first image into an encoder model, wherein the encoder model encodes an input image and an input data item to obtain an encoded image into which the input data item has been embedded as a digital watermark; and obtaining, from the encoder model and in response to inputting the first encoded data item and the first image into the encoder model, a first encoded image into which the first encoded data has been embedded as a digital watermark.

11. The system of claim 10, wherein the one or more data processing apparatus are configured to perform operations further comprising:

inputting the first encoded image into a decoder model, wherein the decoder model decodes an input encoded image to obtain data that is predicted to be embedded as a digital watermark within the input encoded image;

obtaining, from the decoder model and in response to inputting the first encoded image into the decoder model, a second data that is predicted to be the first encoded data;

inputting the second data into a channel decoder, wherein the channel decoder decodes input data to recover original data that was previously encoded by the channel encoder to generate the input data; and obtaining, from the channel decoder and in response to inputting the second data into the channel decoder, third data that is predicted to be the first data.

12. The system of claim 10, wherein the one or more data processing apparatus are configured to perform operations further comprising:

obtaining a set of input training images;
obtaining a first set of training images, wherein each image in the first set of training images is generated by encoding an input training image and an encoded data item using the encoder model, wherein the encoded data item is generated by encoding an original data item using the channel encoder;

inputting the first set of training images into an attack network, wherein the attack network uses a set of input images to generate a corresponding set of images that includes different types of image distortions; and generating, using the attack network and in response to inputting the first set of input training images into the attack network, a second set of training images, wherein images in the second set of training images corresponds to images in the first set of training images.

13. The system of claim 10, wherein the one or more data processing apparatus are configured to perform operations further comprising training the attack network using the first set of training images and the second set of training images, wherein the training comprises:

for each training image in the first set of training images and a corresponding training image in the second set of training images:
inputting the training image from the second set of training images into the decoder model;

obtaining, from the decoder model and in response to inputting the the training image from the second set of training images into the decoder model, a first predicted data item that is predicted to be embedded as a digital watermark within the training image;

determining a first image loss representing a difference in image pixel values between the training image in the first set of training images and the corresponding training image in the second set of training images;

determining a first message loss representing a difference between the first predicted data item and the encoded data item embedded into the training image in the first set of training images; and training the attack network using the first image loss and the first message loss.

14. The system of claim 13, wherein the one or more data processing apparatus are configured to perform operations further comprising training the encoder model and the decoder model, wherein the training comprises:

for each training image in the first set of training images:
inputting the training image into the decoder model;
obtaining, from the decoder model and in response to inputting the training image into the decoder model, a second predicted data item that is predicted to be embedded within the training image;
determining a second image loss representing a difference in image pixel values between the training image and the corresponding input training image;
determining a second message loss representing a difference between the second predicted data item and the encoded data embedded into the training image; and
training each of the encoder model and decoder model using the second image loss, the second message loss, and the first message loss.

15. The system of claim 13, wherein each of the attack model, the encoder model, and the decoder model is a convolutional neural network.

16. The system of claim 14, wherein:
the second image loss comprises an L2 loss and a GAN loss; and
the second message loss comprises an L2 loss.

17. The system of claim 14, wherein each of the first message loss and the first image loss comprises an L2 loss.

18. The system of claim 11, wherein the one or more data processing apparatus are configured to perform operations further comprising training the channel encoder and the channel decoder, wherein the training comprises:
obtaining a set of training data items;
for each training data item in the set of training data items:
generating, using the channel encoder, an encoded training data item;
generating, for the encoded training data item and using a channel distortion approximation model, a modified training data item, wherein the encoded training data item is distorted using the channel distortion approximation model to generate the modified training data item;
determining a channel loss representing a difference between the encoded training data item and the corresponding modified training data item; and
training each of the channel encoder and the channel decoder using the channel loss.

19. A non-transitory computer readable medium storing instructions that, when executed by one or more data processing apparatus, cause the one or more data processing apparatus to perform operations comprising:
obtaining a first image and a first data item that is to be embedded into the first image;
inputting the first data item into a channel encoder, wherein the channel encoder encodes an input data item of a first length into redundant data that (1) includes the input data item and (2) new data this is redundant of of the input data item, and is of second length greater than the first length, wherein the new data enables recovery of the input data in the presence of channel distortion;
obtaining, from the channel encoder and in response to inputting the first data item into the channel encoder, a first encoded data item;
inputting the first encoded data item and the first image into an encoder model, wherein the encoder model encodes an input image and an input data item to obtain an encoded image into which the input data item has been embedded as a digital watermark; and
obtaining, from the encoder model and in response to inputting the first encoded data item and the first image into the encoder model, a first encoded image into which the first encoded data has been embedded as a digital watermark.

20. The non-transitory computer readable medium of claim 19, wherein the instructions cause the one or more data processing apparatus to perform operations comprising:
inputting the first encoded image into a decoder model, wherein the decoder model decodes an input encoded image to obtain data that is predicted to be embedded as a digital watermark within the input encoded image;
obtaining, from the decoder model and in response to inputting the first encoded image into the decoder model, a second data that is predicted to be the first encoded data;
inputting the second data into a channel decoder, wherein the channel decoder decodes input data to recover original data that was previously encoded by the channel encoder to generate the input data; and
obtaining, from the channel decoder and in response to inputting the second data into the channel decoder, third data that is predicted to be the first data.

* * * * *